US012600218B2

(12) United States Patent
Sugimura et al.

(10) Patent No.: US 12,600,218 B2
(45) Date of Patent: Apr. 14, 2026

(54) TRAVEL VEHICLE

(71) Applicant: HONDA MOTOR CO., LTD., Tokyo (JP)

(72) Inventors: Kentaro Sugimura, Wako (JP); Shoichi Rinzaki, Wako (JP); Yoshikazu Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 276 days.

(21) Appl. No.: 18/264,464

(22) PCT Filed: Feb. 9, 2021

(86) PCT No.: PCT/JP2021/004776
§ 371 (c)(1),
(2) Date: Aug. 7, 2023

(87) PCT Pub. No.: WO2022/172326
PCT Pub. Date: Aug. 18, 2022

(65) Prior Publication Data
US 2024/0116349 A1 Apr. 11, 2024

(51) Int. Cl.
*B60K 1/04* (2019.01)

(52) U.S. Cl.
CPC ........ *B60K 1/04* (2013.01); *B60K 2001/0416* (2013.01)

(58) Field of Classification Search
CPC ........................... B60K 1/04; B60K 2001/0416
USPC ........................................................ 180/68.5
See application file for complete search history.

(56) References Cited

U.S. PATENT DOCUMENTS 5,570,752 A * 11/1996 Takata .................. F16H 37/021
310/78
6,095,270 A * 8/2000 Ishikawa .................. B62H 5/00
180/68.5
6,443,253 B1 * 9/2002 Whitehead ............... B60K 1/04
165/41

(Continued)

FOREIGN PATENT DOCUMENTS

JP 2000-051279 A 2/2000
JP 2002-019655 A 1/2002

(Continued)

OTHER PUBLICATIONS

Japanese Office Action dated Mar. 19, 2024 issued in corresponding Japanese application No. 2022-581049; English machine translation included (8 pages).

(Continued)

*Primary Examiner* — Hau V Phan
(74) *Attorney, Agent, or Firm* — Rankin, Hill & Clark LLP

(57) ABSTRACT

A racing kart that is a travel vehicle includes a car body equipped with a seat on which a user can be seated; and a plurality of wheels which are provided to the car body. The seat is configured such that a seating face thereof is positioned lower than the top of the wheels. The car body is provided with a battery housing which is for storing a battery therein and is disposed at the rear of the seat and at a position overlapping at least a part of the seat in a rear view of the car body. The battery housing is slanted such that an upper end thereof is positioned more rearward than a lower end thereof.

7 Claims, 4 Drawing Sheets

(56)                    References Cited

U.S. PATENT DOCUMENTS

| | | | | |
|---|---|---|---|---|
| 6,631,774 | B2* | 10/2003 | Hayashi | B62J 1/28 |
| | | | | 297/188.14 |
| 6,655,483 | B2* | 12/2003 | Hayashi | B62M 7/00 |
| | | | | 180/68.1 |
| 7,455,136 | B2* | 11/2008 | Pleune | B60K 11/04 |
| | | | | 165/41 |
| 8,376,075 | B2* | 2/2013 | Sasage | B62K 11/10 |
| | | | | 180/68.5 |
| 8,640,814 | B2* | 2/2014 | Deckard | B60N 2/01 |
| | | | | 296/205 |
| 9,776,481 | B2* | 10/2017 | Deckard | B60K 13/04 |
| 10,525,839 | B2* | 1/2020 | Chuang | H01M 10/488 |
| 10,569,642 | B2* | 2/2020 | Borud | B60K 11/04 |
| 2002/0003052 | A1 | 1/2002 | Hayashi | |
| 2008/0012391 | A1 | 1/2008 | Nakata et al. | |
| 2014/0077581 | A1* | 3/2014 | Kanno | B60L 50/66 |
| | | | | 301/6.5 |
| 2019/0217909 | A1* | 7/2019 | Deckard | B60N 2/58 |
| 2020/0122590 | A1 | 4/2020 | Ko | |
| 2021/0313647 | A1 | 10/2021 | Itai et al. | |

FOREIGN PATENT DOCUMENTS

| | | |
|---|---|---|
| JP | 2003-251078 A | 9/2003 |
| JP | 2007-060806 A | 3/2007 |
| JP | 2008-18904 A | 1/2008 |
| JP | 2014-125094 A | 7/2014 |
| JP | 2020-524884 A | 8/2020 |
| WO | 2020/017324 A1 | 1/2020 |

OTHER PUBLICATIONS

International Search Report, International Application No. PCT/JP2021/004776, Date of mailing: Apr. 13, 2021, 2 pages.

* cited by examiner

12A(10A)

TRAVEL VEHICLE

TECHNICAL FIELD

The present invention relates to a travel vehicle (traveling vehicle) that travels based on power supply from a battery.

BACKGROUND ART

In recent years, electric traveling vehicles equipped with batteries have been being developed from the viewpoint of convenience and environmental protection. Traveling vehicles used for racing or recreational purposes are no exception. For example, JP 2007-060806 A discloses an electric racing kart (traveling vehicle) equipped with a motor and a battery for supplying electric power to the motor. This traveling vehicle includes a pair of batteries sideward of a seat on which a user U sits.

SUMMARY OF THE INVENTION

In the case of the traveling vehicle of JP 2007-060806 A, since the batteries are provided sideward of the seat, a large amount of relative wind hits the batteries during traveling. In particular, because a traveling vehicle used for racing is configured to be lightweight, the traveling of the vehicle is easily disturbed under the influence of the relative wind. In addition, in a case where a large-sized battery is mounted in order to drive the traveling vehicle for a long time, there is a possibility that the battery will block a side view of the user sitting on the seat.

The present invention has been made in view of the above circumstances, and an object of the present invention is to provide a traveling vehicle in which a sufficient field of view is acquired and the traveling stability is further improved with a lesser influence of the relative wind.

In order to achieve the object, an aspect of the present invention is a traveling vehicle including: a vehicle body including a seat on which a user sits; and a plurality of wheels provided to the vehicle body, wherein a height of at least part of a seating surface of the seat is lower than upper parts of the plurality of wheels, wherein the vehicle body includes a battery housing portion that houses a battery at a position rearward of the seat and overlaps at least part of the seat in a rear view of the vehicle body, and the battery housing portion inclines in a manner so that an upper end portion is located further rearward than a lower end portion.

The above traveling vehicle can provide a sufficient field of view and further improve the traveling stability by reducing the influence of the relative wind.

DETAILED DESCRIPTION OF THE INVENTION

A description will be presented and described in detail below with reference to the accompanying drawings concerning an embodiment of the present invention.

Figure 1:
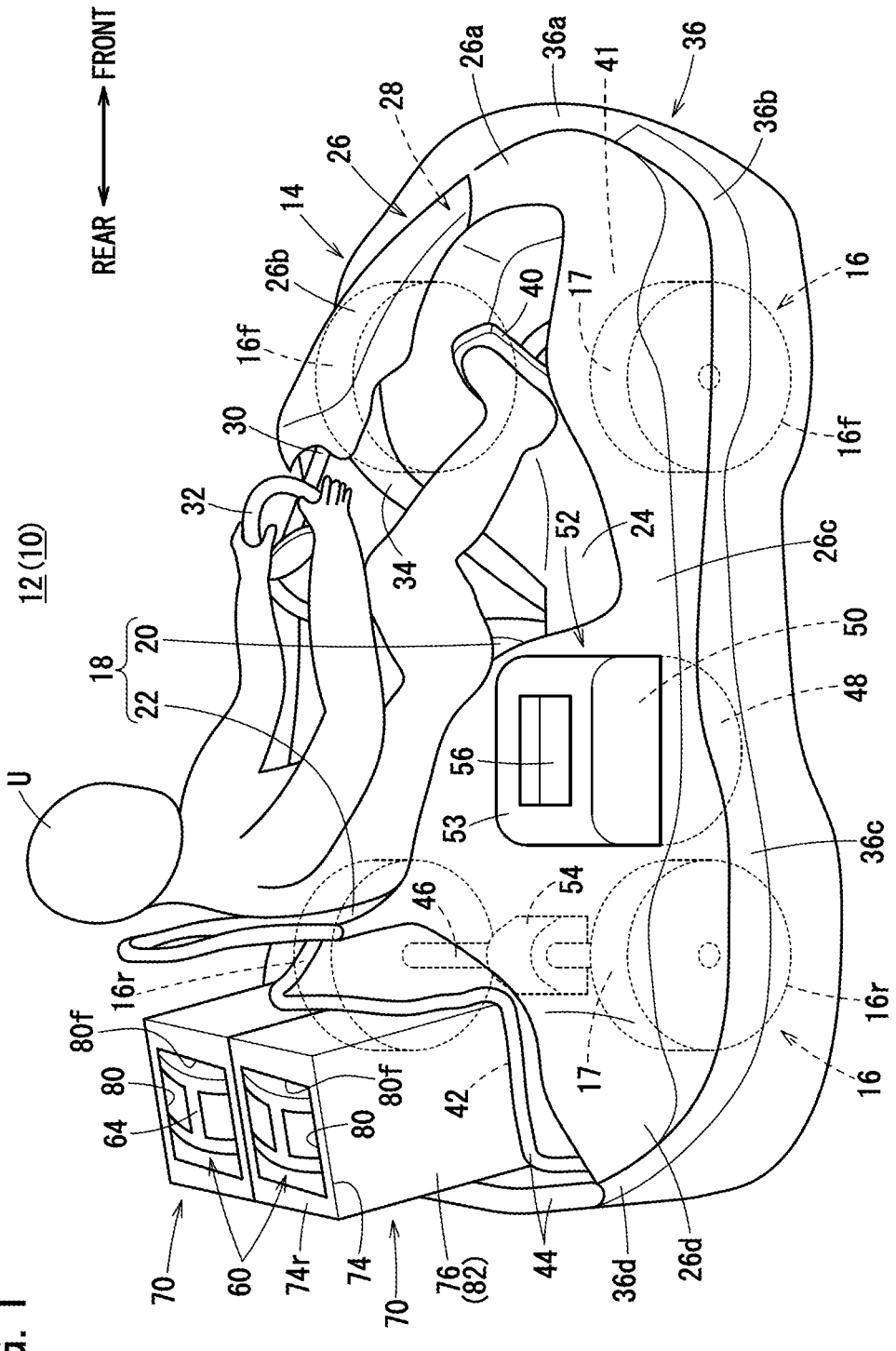
FIG. 1 is a side perspective view of an overall configuration of a racing kart as a traveling vehicle according to an embodiment of the present invention.

As shown in FIG. 1, a traveling vehicle 10 according to one embodiment of the present invention is configured as an electric racing kart (hereinafter, simply referred to as a racing kart 12) used in a dedicated racing place, an amusement facility, and suchlike. The racing kart 12 includes a vehicle body 14 and a plurality of (four) wheels 16 attached to the vehicle body 14. The vehicle body 14 includes a seat 18 on which a user U who is a driver sits. In the case of this type of racing kart 12, in order to suppress the influence of the relative wind as much as possible, the height (a position in the vehicle height direction) of at least part of a seating surface 20 of the seat 18 with which the buttocks of the user U come into contact is set lower than the height of the upper portions (specifically, upper ends 17) of the plurality of wheels 16. A backrest portion 22 of the seat 18 inclines rearward and upward from the seating surface 20. The traveling vehicle 10 is not limited to the racing kart 12 and may be, for example, a vehicle that can run on a public road, an amusement toy, and suchlike. In addition, the seating surface 20 of the seat 18 may be horizontal with respect to a road surface R, and the backrest portion 22 of the seat 18 may be vertical or substantially vertical with respect to the seating surface 20 provided horizontally.

The racing kart 12 is for one person, and the vehicle body 14 is configured to be short (compact) in the front-rear direction. The length of the vehicle body 14 in the front-rear direction is set in a range of about 1 m to 2 m, for example. The vehicle width of the vehicle body 14 is shorter than the length of the vehicle body 14 in the front-rear direction. The seat 18 is provided on a widthwise center line CL, a center line with respect to the vehicle width direction of the vehicle body 14. The vehicle body 14 includes a pair of front wheels 16f (part of the four wheels 16) further forward than the seat 18 and a pair of rear wheels 16r (part of the four wheels 16) further rearward than the seat 18.

The vehicle body 14 of the racing kart 12 is formed by mutually assembling a main panel 24 that extends in the front-rear direction with the seat 18 fixed to an upper surface, and a plurality of frames (not shown) fixed to the main panel 24. The main panel 24 has appropriate rigidity, is formed to be substantially the same as the width of the seat 18, and constitutes a floor portion of the racing kart 12. The legs of the user U sitting on the seat 18 are rested, being stretched forward along the main panel 24.

The vehicle body 14 includes a plurality of cowls 26 so as to surround the periphery (front, rear, and both sides) of the main panel 24. The plurality of cowls 26 are fixed to and supported by an appropriate frame to form a substantially continuous appearance as a whole. For example, the plurality of cowls 26 include a front cowl 26a on a front side of the vehicle body 14, a center cowl 26b extending rearward from a vehicle-width-direction center position of the front cowl 26a, a pair of front side cowls 26c provided on the front side and on both sides of the vehicle body 14, and a pair of rear side cowls 26d provided on a rear side and on both sides of the vehicle body 14.

A steering mechanism 28 for steering the pair of front wheels 16f is provided on the front side of the main panel 24. The steering mechanism 28 includes a steering shaft 30 inclining rearward and upward, and a steering wheel 32 that is gripped and operated by the user U and is provided at an upper end of the steering shaft 30. A lower extending portion of the steering shaft 30 is covered by the center cowl 26b and a console panel 34.

The steering mechanism 28 changes a turning amount of the pair of front wheels 16f following a rotating amount of the steering shaft 30 by combining a frame, a hinge, and suchlike (not shown) on a lower side of the steering shaft 30. A starter switch (not shown) and suchlike for turning on and off the start of the racing kart 12 is provided on a surface of the console panel 34 facing the user U.

In addition, the vehicle body 14 includes a plurality of bumpers 36 that mitigate impacts and are provided further outward than the plurality of cowls 26 (the front cowl 26a, the front side cowls 26c, and the rear side cowls 26d) that surround the front, rear, and both sides of the vehicle body 14. The bumper 36 is configured by mutually connecting a front bumper 36a provided coupled to the front cowl 26a, a pair of front side bumpers 36b coupled to the pair of front side cowls 26c, a pair of rear side bumpers 36c coupled to the pair of rear side cowls 26d, and a rear bumper 36d on the rear side. Each bumper 36 protrudes further outward than each wheel 16 and is positioned further downward than the center of each wheel 16.

Further, an accelerator pedal 40 and a brake pedal (not shown) are provided on the front side of the main panel 24. The accelerator pedal 40 and the brake pedal are provided so as to sandwich the steering shaft 30 (console panel 34). For example, the accelerator pedal 40 is located on the right side of the steering shaft 30 when viewed from the user U, and the sole of the right foot is placed on the accelerator pedal 40 when the user U drives the racing kart 12. The brake pedal is located on the left side of the steering shaft 30 when viewed from the user U, and the sole of the left foot is placed on the brake pedal when the user U drives the racing kart 12.

The accelerator pedal 40 is provided to be able to act on an accelerator mechanism 41 fixed to the main panel 24. The accelerator mechanism 41 electrically or mechanically transmits an accelerator operation amount (a depression amount of the accelerator pedal 40) of the user U to an ECU 56 (Electronic Control Unit) for travel control that is described later. The brake pedal is provided to be able to act on a brake mechanism fixed to the main panel 24. For example, the brake mechanism preferably adopts a structure (hydraulic, wire, and suchlike) capable of mechanically applying a braking force to a braking unit (not shown) that brakes the pair of front wheels 16f and rear wheels 16r.

The main panel 24 rotatably supports an axle 46 extending in the vehicle width direction at a rear side of the vehicle body 14. The rear wheel 16r is fixed to each of end portions of the axle 46 in the vehicle width direction.

The vehicle body 14 is provided with, at a side of the seat 18, a PU 52 (Power Unit) in which a motor 48 and a power adjustment unit 50 that adjusts power supplied to the motor 48 are integrated as one unit. For example, the PU 52 has one housing 53 that houses the motor 48, the power adjustment unit 50, and the ECU 56 described below. The PU 52 constitutes part of an electrical unit of the racing kart 12 and is fixed at a position higher than the pair of rear wheels 16r in the vehicle height direction, and forward of the pair of rear wheel 16r. Because of the presence of the PU 52 on the side, the seat 18 and the steering wheel 32 coupled to the vehicle body 14 are slightly shifted in the vehicle width direction (the direction opposite to the installation position of the PU 52) with respect to the widthwise center line CL (see FIG. 2) of the vehicle body 14. However, since the PU 52 is disposed at the side of the seat 18, the vehicle body 14 is further made compact in the front-rear direction.

The motor 48 rotates based on electric power supplied from a battery 60, which is a power source, and rotates the axle 46 via a driving force transmission mechanism 54. The motor 48 is only required to output an appropriate rotational driving force capable of smoothly rotating the pair of rear wheels 16r. Either an AC motor or a DC motor may be adopted as the motor 48.

The driving force transmission mechanism 54 includes a plurality of gears, pulleys, chains, and suchlike provided between an output shaft of the motor 48 and the axle 46, and transmits the rotational driving force of the motor 48 to the axle 46. For example, a centrifugal clutch that seamlessly connects the clutch based on an operating amount of the accelerator pedal 40 can be adopted as the driving force transmission mechanism 54.

The power adjustment unit 50 is provided above the motor 48. The power adjustment unit 50 appropriately adjusts the power of the battery 60 supplied to the motor 48 under the control of the ECU 56. When the motor 48 is an AC motor, the power adjustment unit 50 is configured to convert the DC power of the battery 60 into three-phase AC power and supply the three-phase AC power to the motor 48.

Figure 2:
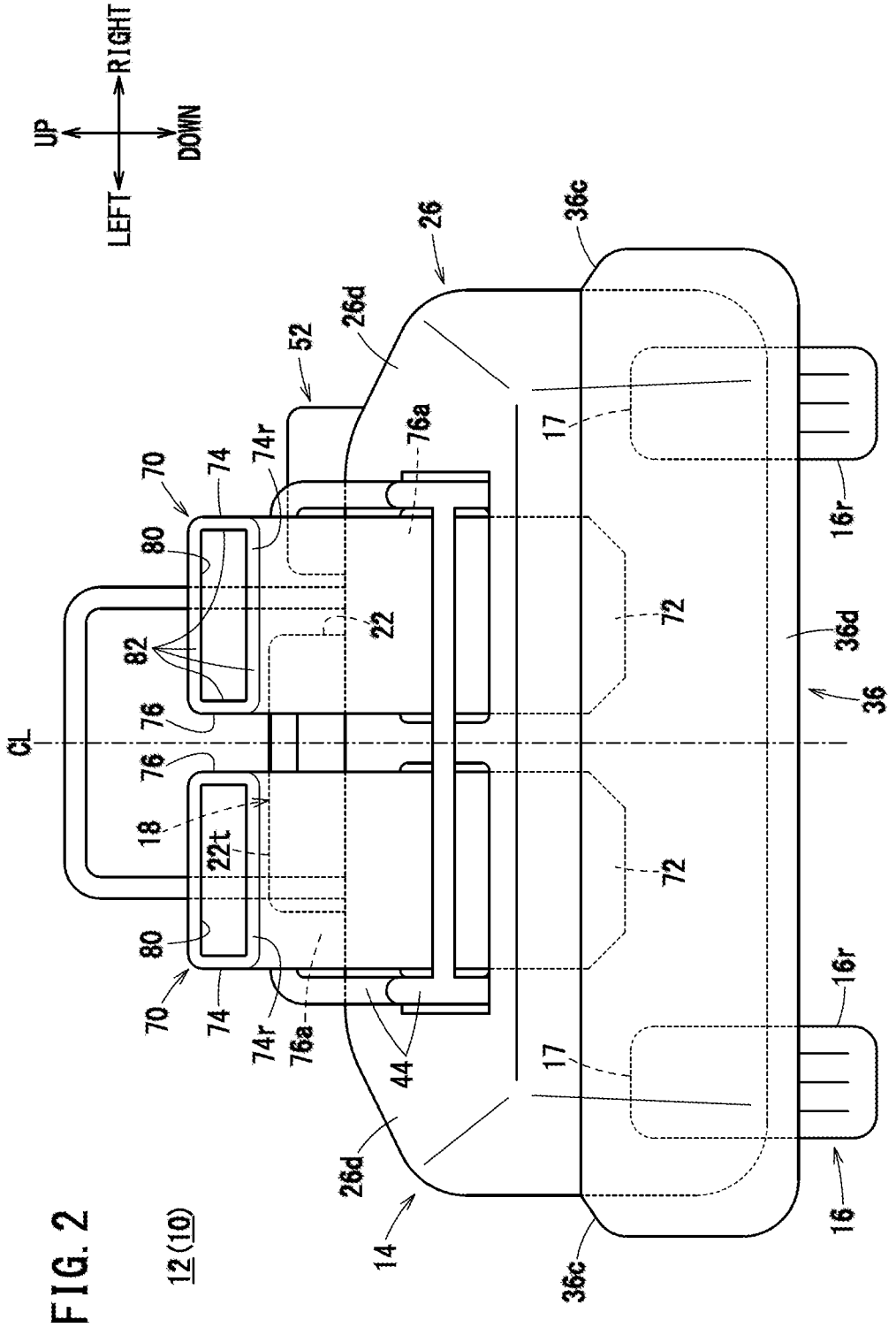
FIG. 2 is a rear view schematically showing battery cases of the racing kart.

The racing kart 12 includes a battery case 70 (battery housing portion) that detachably houses the battery 60. A plurality of (two) battery cases 70 according to the present embodiment are provided rearward of the seat 18. As shown in FIG. 2, the two battery cases 70 are provided at positions symmetrical to each other with respect to the widthwise center line CL of the vehicle body 14 (FIG. 2 is a rear view of the vehicle body 14, and the up-down direction of the drawing is along the vehicle height direction, but for convenience, the widthwise center line CL is shown along the up-down direction of the drawing).

Each battery case 70 is formed in an elongated rectangular tube shape. The lower end of each battery case 70 is fixed to a frame (not shown) coupled to the main panel 24 at a position adjacent to the rear of the seat 18.

A holding opening 42 for inserting and arranging each battery case 70 is provided between a pair of rear side cowls 26d on the rear side of the vehicle body 14. The holding opening 42 is provided with a plurality of housing portion frames 44 that support the battery cases 70. The plurality of housing portion frames 44 are joined to the main panel 24. Each battery case 70 is fixed to the plurality of housing portion frames 44 in an inclining posture. A junction box (not shown) that distributes electric power from the battery 60 to the PU 52, the ECU 56, and suchlike is provided at a coupling portion between the lower end portion 72 of the battery case 70 and the housing portion frame 44 (or at the main panel 24 near the coupling portion). The junction box may be provided on the lower end portion 72 side in the battery case 70.

Each battery case 70 described above inclines in such a way that each battery case 70 at least partially overlaps the seat 18 in a rear view of the vehicle body 14 and that an upper end portion 74 (including at least a lid described below and/or an opening 80 described below) is positioned further rearward than a lower end portion 72 (including at least a later-described bottom wall 84 provided at a position facing the lid and/or the opening 80). The battery cases 70 installed on the rear side of the seat 18 are fixed in the same posture in a side view of the vehicle body 14. That is, the racing kart 12 fixes the pair of battery cases 70 at positions symmetrical to each other and in the same posture with respect to the widthwise center line CL as a base point (axis of symmetry). Thus, the center of gravity of each battery 60 can be caused to coincide with the widthwise center line CL in a state in which the battery 60, which is a heavy object, has been housed in each battery case 70.

Figure 3:
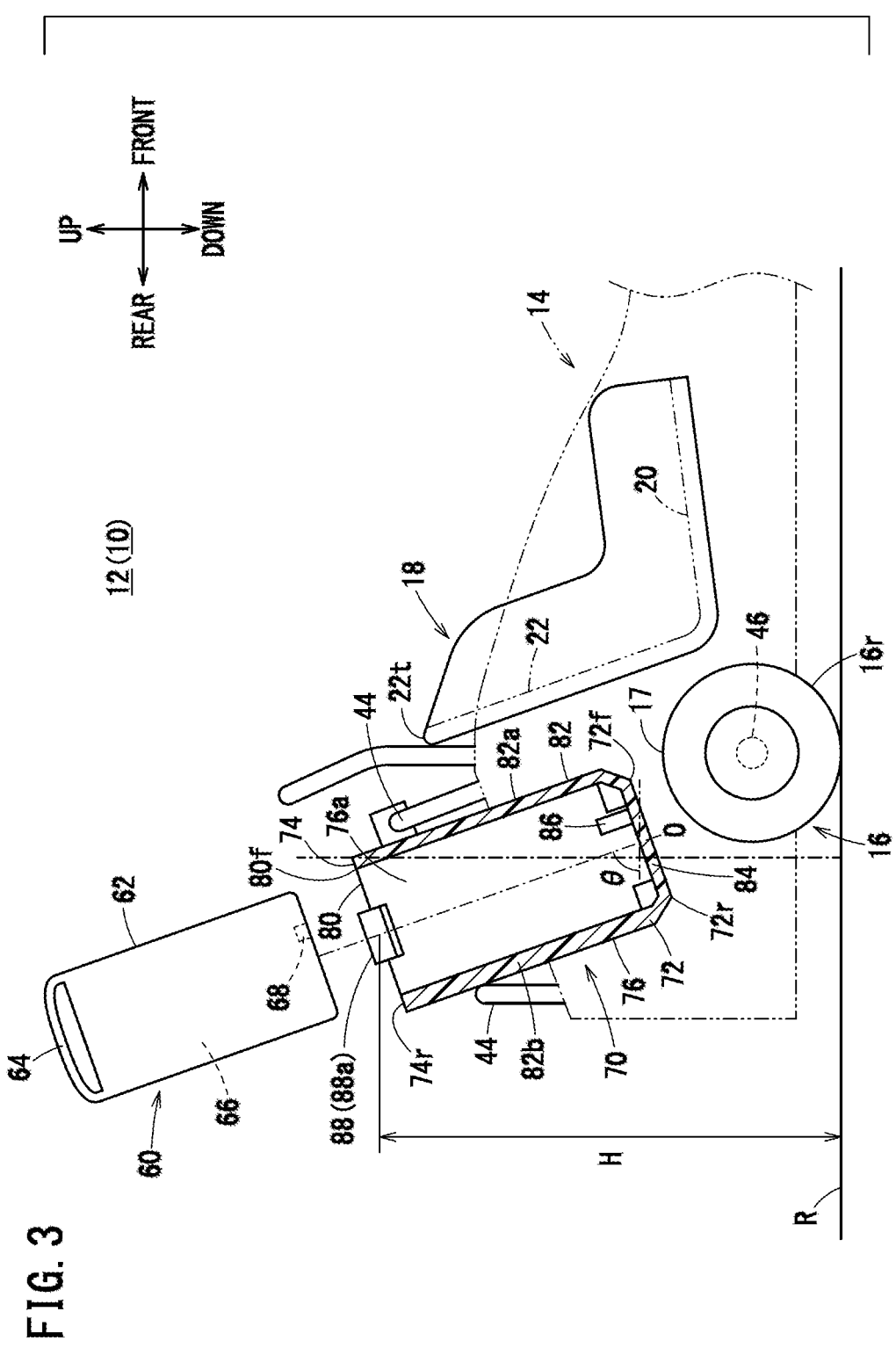
FIG. 3 is a side view schematically showing the arrangement of a rear wheel, a seat, and a battery case of the racing kart.

As shown in FIG. 3, it is preferable that an axis O in the insertion/removal direction of the battery 60 in each battery case 70 be set substantially parallel to the backrest portion 22 of the seat 18. Thereby, each battery case 70 can be brought closer to the seat 18, and the length of the vehicle body 14 in the front-rear direction can be shortened. An inclination angle θ of each battery case 70 with respect to a road surface R is not particularly limited, but may be set to, for example, less than 90°, preferably within a range of 50° to 80°. Each battery case 70 is provided so as to at least partially overlap the seat 18 in a rear view of the vehicle body 14. Thus, when the racing kart 12 travels, the relative wind coming from the front can be suppressed from hitting each battery case 70 and thus becoming the drag. In addition, since each battery case 70 is installed at the inclination angle θ also at a portion that does not overlap the seat 18 in the rear view of the vehicle body 14, each battery case 70 can let the relative wind coming from the front flow rearward while the racing kart 12 is traveling.

At least part of each battery case 70 overlaps the rear wheels 16r in a plan view of the vehicle body 14 and is provided at a position higher than the rear wheels 16r and higher than the seating surface 20 of the seat 18 in a side view of the vehicle body 14. To be more specific, the front end 72f of the lower end portion 72 of each battery case 70 is located over the rear wheel 16r (at a position overlapping the rear wheel 16r in a plan view of the vehicle body 14) while the rear end 72r thereof is located further rearward than the rear wheel 16r. Accordingly, a large load can be applied to the pair of rear wheels 16r in a state in which each battery 60 is housed in each battery case 70, and a configuration in which the upper end portion 74 is located further rearward than the lower end portion 72 can be realized in a compact manner. In addition, the center of gravity of the racing kart 12 can be lowered, and the traveling stability can be enhanced.

In a side view of the vehicle body 14, the upper end portion 74 of each battery case 70 is located further upward than the upper end 22t of the seat 18, and the entire upper end portion 74 is located further rearward than the rear wheels 16r (see the one-dot chain line in FIG. 3). A rear end side 74r of the upper end portion 74 may protrude further rearward than the rear bumper 36d.

As shown in FIGS. 1 and 3, each battery case 70 includes a housing main body 76 having a housing space 76a for housing the battery 60. The upper end portion 74 of the housing main body 76 is provided with an opening 80 communicating with the housing space 76a. The battery case 70 may include a lid (opening/closing portion, not shown) that can open and close the housing space 76a and the opening 80.

The housing main body 76 has four side walls 82 coupled to each other and a bottom wall 84 coupled to a lower portion of each side walls 82 to form the housing space 76a. The four side walls 82 and the bottom wall 84 define an axis O of the housing space 76a and guide the insertion/removal direction of the battery 60. In other words, the side walls 82 are provided parallel to the insertion/removal direction of the battery 60.

In addition, a sidewall 82b located on the lower side of the housing main body 76 may be formed to be thicker than the other side walls 82 (a side wall 82a on the upper side). As a result, the lower side wall 82b has sufficient rigidity to withstand the load received from the battery 60 when the battery 60 is inserted and removed, whereby the battery 60 can be smoothly guided.

Terminals 86 are provided on a surface of the bottom wall 84 on the housing space 76a side. The terminals 86 are in electrical contact with the terminal 68 of the battery 60 in a state where the battery 60 is housed, whereby electric power can be output to the electrical unit of the racing kart 12.

The opening 80 of each battery case 70 is provided so as to be orthogonal to the axis O of the battery case 70 and is thereby inclined so as to face rearward and upward of the vehicle body 14. In a side view of the vehicle body 14, part of each opening 80 (front end 80f) is located further rearward than the rear wheel 16r and further upward than the upper end 22t of the backrest portion 22 of the seat 18. Part of each opening 80 may be provided at the same height as the upper end 22t of the backrest portion 22 of the seat 18. Since part of the opening 80 is positioned further rearward than the rear wheel 16r in a side view of the vehicle body 14, the user U can easily access the battery 60 from behind the vehicle body 14 when the battery 60 is stored or taken out. Since part of the opening 80 is positioned further upward than or at the same height as the upper end 22t of the backrest portion 22 of the seat 18, the opening 80 can be provided at a height position where the user U's back touches the seat 18 when the user U sits on the seat 18, and the opening 80 can be set at a position where the user U does not need to bend their body much when placing or removing the battery 60. The height H of the center position of the opening 80 from the road surface R is preferably in a range of 50 cm to 100 cm, for example.

The battery 60 installed in the battery case 70 is configured as a general-purpose type that is detachably installed on various devices. For example, as shown in FIGS. 3, the battery 60 has a housing 62 that is formed in a rectangular column shape as a whole, and a handle 64 held by the user U is provided at one axial end portion of the housing 62. The battery 60 includes in the housing 62 a plurality of battery cells 66 for storing and discharging electric power and also includes terminals 68 capable of inputting and outputting electric power at a predetermined position on an outer surface of the housing 62. The terminal 68 is provided, for example, on an end surface that is opposite to the surface where the handle 64 is present (or that is on the same side as the handle 64), and the terminal 68 comes into contact with the terminal 86 in the battery case 70 when the battery 60 is housed in the battery case 70.

A lock mechanism 88 for preventing detachment of the battery 60 housed in the housing space 76a is provided on an inner surface of the upper end portion 74 side of the side wall 82. For example, the lock mechanism 88 is configured by a pair of lock plates 88a that open outward in the widthwise direction while the battery 60 is not installed and that close as the battery 60 is inserted. In a state where the battery 60 is housed in the housing main body 76 and is locked by the lock mechanism 88, the pair of lock plates 88a press the upper portion of the battery 60. As a result, the contact state between each of the terminals 68 of the battery 60 and each of the terminals 86 of the battery case 70 is maintained in a favorable manner.

As shown in FIG. 1, the ECU 56 is connected to an upper portion of the power adjustment unit 50, for example, and constitutes part of the electrical unit of the racing kart 12. The ECU 56 is configured by a computer including one or more processors, memories, input/output interfaces, electronic circuits, and suchlike. The ECU 56 acquires an accelerator operation amount of the accelerator pedal 40 and outputs an appropriate power command to the power adjustment unit 50 based on the accelerator operation amount, thereby controlling the rotation speed of the motor 48.

The ECU 56 is configured to appropriately distribute electric power of the batteries 60 housed in the pair of battery cases 70 to the motor 48 via a junction box (not shown). For example, the ECU 56 performs control in a manner so that electric power of one battery 60 is used until the remaining amount of the one battery 60 becomes equal to or less than a predetermined value, and when the remaining amount of the one battery 60 becomes equal to or less than the predetermined value, the electric power of the other battery 60 is used. Alternatively, the ECU 56 may be configured to use electric power of the two batteries 60 substantially equally. As an example, when the rotation speed of the motor 48 is low, electric power of one battery 60 is used, and when the rotation speed of the motor 48 is high, electric power of both batteries 60 is used.

The traveling vehicle 10 (racing kart 12) according to the present embodiment is basically configured in the manner described above. Hereinafter, a description will be given concerning operations of the traveling vehicle 10.

The user U (or a helper) of the racing kart 12 puts the battery 60 into each of the pair of battery cases 70 before traveling and suchlike. As described above, in the case of the racing kart 12, the opening 80 of the battery case 70 is located further rearward than the seat 18 and further upward than the pair of rear wheels 16*r* and the seat 18. Accordingly, the user U can easily align a lower portion of the battery 60, which is a heavy object, with the opening 80 by accessing the opening 80 from the rear side of the vehicle body 14.

The user U inserts the battery 60 deeper into the housing space 76*a* by aligning the posture of the battery 60 with the axis O of the battery case 70. At this time, the side walls 82 of the battery case 70 smoothly guide the insertion of the battery 60 along the axis O, and the lower side wall 82*b* receives part of the load from the battery 60. When the lower portion of the battery 60 is inserted up to the vicinity of the bottom wall 84, the terminals 86 of the battery case 70 come into contact with the terminals 68 of the battery 60. The battery case 70 locks the battery 60 with respect to the housing main body 76 with the lock mechanism 88, thereby preventing the battery 60 from coming out.

As shown in FIG. 1, when the user U sits on the seat 18 and turns on a starter switch and suchlike, the electric power of the battery 60 is supplied to each electrical unit to start the racing kart 12. By depressing the accelerator pedal 40 and gripping and operating the steering wheel 32, the user drives the racing kart 12. The racing kart 12 positions the center of gravity of the entire batteries 60 on the widthwise center line CL by providing the respective battery cases 70 housing the batteries 60 at symmetrical positions with respect to the widthwise center line CL of the vehicle body 14 as a base point. Further, by arranging the battery cases 70 housing the batteries 60 behind the seat 18, the center of gravity of the entire batteries 60 is positioned behind the seat 18 in a plan view of the vehicle body 14, and the operability of the steering wheel 32 by the user U is improved and high turning performance is obtained.

As shown in FIG. 3, each battery 60, which inclines above the rear wheels 16*r*, i.e., whose one part (end) is provided rearward of the rear wheels 16*r* and whose other part (end) is provided above the rear wheels 16*r*, can apply a load to a lower position of the vehicle body 14 and a position near each rear wheel 16*r*, and can enhance the gripping force of each rear wheel 16*r*. Furthermore, the battery cases 70 disposed behind the seat 18 do not block the front and side view of the user U. That is, the racing kart 12 can further enhance the traveling stability by appropriately installing the battery cases 70 as described above.

During traveling, the racing kart 12 receives the relative wind from the front. Each battery case 70 is provided so as to at least partially overlap the seat 18 in a rear view of the vehicle body 14. Thus, when the racing kart 12 travels, the relative wind hitting from the front can be suppressed from hitting each battery case 70 and thus becoming the drag. Furthermore, even the portion of each battery case 70 that does not overlap the seat 18 in the rear view of the vehicle body 14 inclines in such a way that the upper end portion 74 is positioned further rearward than the lower end portion 72, and thus each battery case 70 easily lets the relative wind flow rearward that hits the racing kart 12 from the front during traveling. Therefore, the racing kart 12 can travel while suppressing the drag of the relative wind.

Since the pair of battery cases 70 including the pair of housing portion frames 44 are disposed at the rear position and the adjacent position of the seat 18, when another racing kart 12 collides with the racing kart 12 from behind, the user U is protected from the other racing kart 12, which is prevented from coming into contact with the user U. That is, the racing kart 12 can use each battery case 70 as a structure for protecting the user U.

The present invention is not limited to the above-described embodiments, and various modifications can be made within the scope of the invention. For example, the racing kart 12 may include three or more battery cases 70 rearward of the seat 18. Although the opening 80 of the battery case 70 is located further rearward than the rear wheel 16*r* in the above-described embodiment, part (front end) of the opening 80 may be located above the rear wheel 16*r* in a side view of the vehicle body 14. As a result, the battery case 70 can be disposed closer to the seat 18, and the length of the vehicle body 14 in the front-rear direction is reduced.

Figure 4:
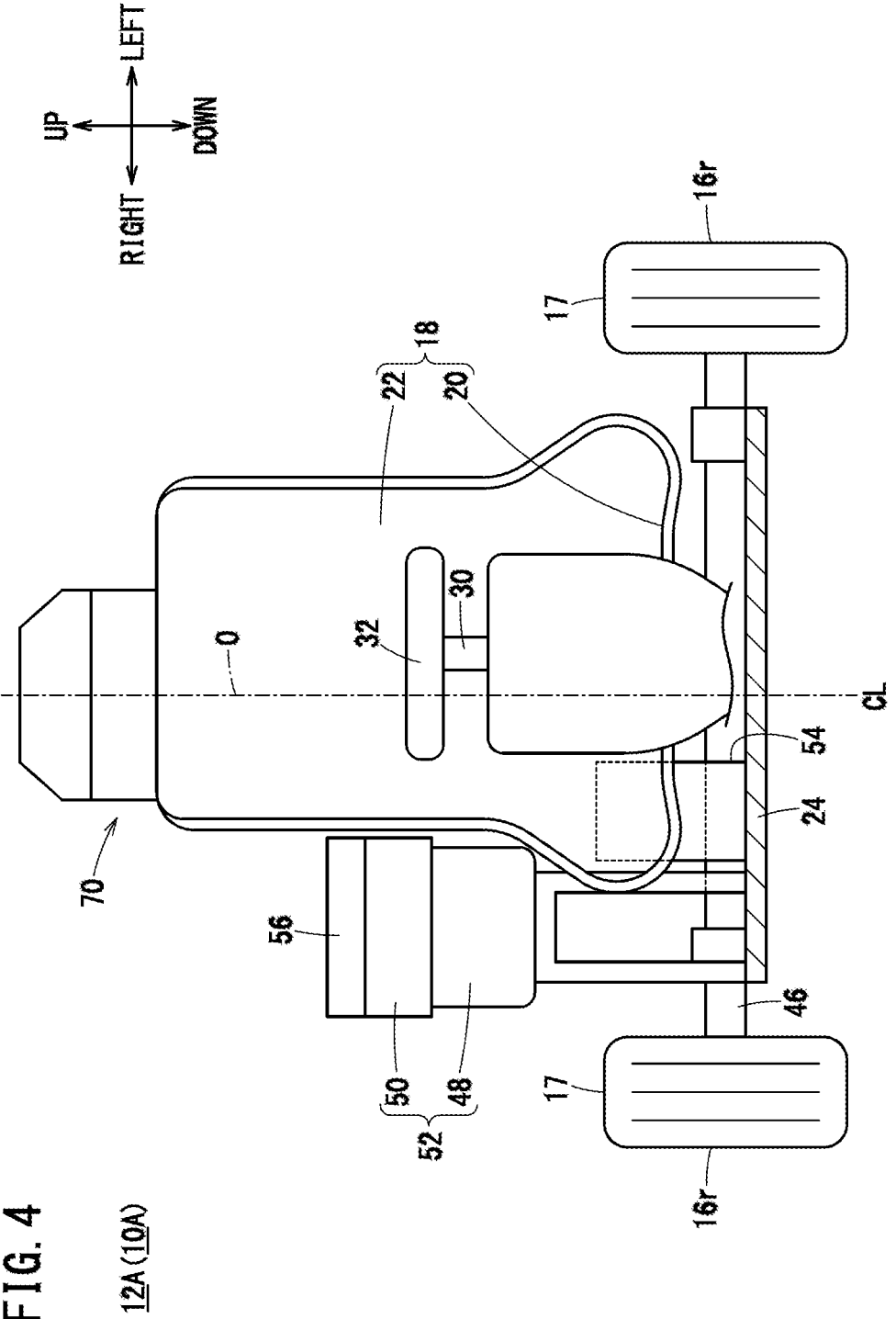
FIG. 4 is a partial front view schematically showing a racing kart according to a modified example.

As in a modified example shown in FIG. 4, a racing kart 12A (traveling vehicle 10A) may be configured to include one battery case 70 behind the seat 18. In this case, the tracing kart 12 preferably fixes the battery case 70 in such a way that the central position (axis O) of the battery case 70 in the vehicle width direction overlaps the widthwise center line CL. In addition, the racing kart 12A may have a configuration in which the housing 53 is omitted and the PU 52 from which the motor 48 and the power adjustment unit 50 are exposed is installed. As a result, the seat 18 and the steering wheel 32 can be brought sufficiently close to the widthwise center line CL even in the configuration in which the PU 52 is provided at the side of the seat 18.

The battery 60 may be not attachable to and detachable with respect to the battery housing portion (battery case 70). That is, the battery 60 and the battery housing portion may form a stationary battery that does not have the terminals 68 and 86, respectively, and that establishes electrical connection from the battery 60 to the electrical unit with a harness and suchlike.

A description will be given below concerning the technical concepts and advantageous effects capable of being grasped from the above-described embodiments.

One aspect of the present invention is the traveling vehicle 10, 10A including the vehicle body 14 having the seat 18 on which a user U sits, and the plurality of wheels 16 provided to the vehicle body 14, wherein the height of at least part of the seating surface 20 of the seat 18 is lower than upper parts of the plurality of wheels 16, wherein a battery housing portion (battery case 70) that houses the battery 60 at a position rearward of the seat 18 and overlaps at least part of the seat 18 in a rear view of the vehicle body 14, and the battery housing portion inclines in a manner so that the upper end portion 74 is located further rearward than the lower end portion 72.

According to the invention above, the traveling vehicle 10, 10A includes the battery case 70 that houses the battery 60 at a position rearward of the seat 18 and overlaps at least part of the seat 18 in the rear view of the vehicle body 14. Thus, when the user U sits on the seat 18, the battery case 70 does not block the front and side views of the user U. Further, the battery housing portion (battery case 70) inclines in such a way that the upper end portion 74 is located further rearward than the lower end portion 72, the vehicle body 14 can be lowered in comparison with a case where the battery housing portion is arranged along the vertical direction. As a result, the center of gravity of the traveling vehicles 10, 10A can be lowered and thus the traveling stability is improved. Further, since the battery case 70 housing the battery 60 is located at a position where the battery case 70 overlaps at least part of the seat 18 in the rear view of the vehicle body 14, it is possible to suppress the drag caused by the relative wind hitting each battery case 70 from the front during the traveling of the racing kart 12. Even if the relative wind hits each battery case 70, since the battery housing portion inclines in such a way that the upper end portion 74 is located further rearward than the lower end portion 72, the battery housing portion can properly let the relative wind flow rearward. The battery housing portion disposed behind the seat 18 can protect the user U at the time of a collision from behind.

In addition, the seat 18 includes the backrest portion 22 inclining rearward and upward from the seating surface 20, and the battery housing portion (battery case 70) is provided parallel to the backrest portion 22. As a result, in the case of the traveling vehicles 10, 10A, the battery housing portion inclining rearward is installed close to the seat 18, whereby the length of the vehicle body 14 in the front-rear direction can be further shortened.

At least part of the battery housing portion (battery case 70) is provided at a position overlapping, in a plan view of the vehicle body 14, the rear wheel 16r constituting part of the plurality of wheels 16. As a result, in the case of the traveling vehicles 10, 10A, the length of the vehicle body 14 in the front-rear direction can be made compact, and the load of the battery 60 can be easily applied to the vicinity of the rear wheels 16r so that the ground contact load (gripping force) of the rear wheels 16r can be increased.

The battery 60 is attachable to and detachable from the battery housing portion (battery case 70), and the upper end portion 74 of the battery housing portion is provided with the opening 80 configured to house the battery 60 or the opening/closing portion configured to open and close the opening 80. Accordingly, in the case of the traveling vehicles 10, 10A, the opening 80 for attaching and detaching the battery 60 or the opening/closing portion for opening and closing the opening 80 can be positioned higher than in a case where a battery housing portion would be provided horizontally, and thus the amount of stooping (bending a body) by the user U can be reduced. Therefore, the user U can more easily insert and remove the battery 60.

At least part of the opening 80 or at least part of the opening/closing portion is provided at the same height as the upper end 22t of the seat 18 or further upward than the upper end 22t of the seat 18. As a result, the user U can insert and remove the battery 60 into and from the battery housing portion (battery case 70) without considerably bending a body from an upright posture. When at least part of the opening 80 is provided above the upper end 22t of the seat 18, part of each battery case 70 does not overlap the seat 18 in the rear view of the vehicle body 14 (has a protruding portion protruding further upward than the upper end 22t of the seat 18), but the battery case 70 installed at the inclination angle θ can properly let the relative wind flow that hits the protruding portion from the front when the racing kart 12 travels.

The opening 80 or the opening/closing portion configured to open and close the opening is provided, in the side view of the vehicle body 14, above the rear wheel 16r constituting part of the plurality of wheels 16 or further rearward than the rear wheel 16r. Accordingly, in the case of the traveling vehicles 10, 10A, the opening 80 can be disposed at an appropriate height at a rear portion of the vehicle body 14 or in the vicinity of the rear end of the vehicle body 14, and thus the user U can easily insert and remove the battery 60 from the rear side of the vehicle body 14.

Further, the front end 72f of the lower end portion 72 of the battery housing portion (battery case 70) overlaps the rear wheel 16r in a plan view of the vehicle body 14, and the rear end 72r of the lower end portion 72 is positioned further rearward than the rear wheel 16r in a side view of the vehicle body 14. As a result, the rear end 72r of the lower end portion 72 becomes lower than the front end 72f side, and the battery housing portion easily takes the inclining posture. Therefore, in the case of the traveling vehicles 10, 10A, the center of gravity can be further lowered while the drag of the relative wind is reduced, and the front end 72f of the lower end portion 72 applies the load of the battery 60 to the rear wheels 16r from above the rear wheels 16r, whereby the grip force is sufficiently improved. In addition, it is possible to make the configuration compact in which the upper end portion 74 is located further rearward than the lower end portion 72.

The invention claimed is:

1. A traveling vehicle comprising: a vehicle body including a seat on which a user sits, the seat including a seat back and a seating surface; and a plurality of wheels provided to the vehicle body, wherein a height of at least part of the seating surface of the seat is lower than upper parts of the plurality of wheels, wherein the vehicle body includes a battery housing portion that houses a battery at a position rearward of the seat and overlaps at least part of the seat in a rear view of the vehicle body, the battery housing portion inclines in a manner so that an upper end portion is located further rearward than a lower end portion, the battery is attachable to and detachable from the battery housing portion, the upper end portion of the battery housing portion is provided with an opening configured to house the battery or an opening/closing portion configured to open and close the opening, and at least the upper end portion of the battery housing portion is located further upward than a top of the seat back, the upper end portion of the battery housing portion protruding from the outer surface of the vehicle body so as to be exposed on an outside of the outer surface.

2. The traveling vehicle according to claim 1, wherein the seat includes a backrest portion that inclines rearward and upward from the seat surface, and the battery housing portion is provided parallel to the backrest portion.

3. The traveling vehicle according to claim 1, wherein at least part of the battery housing portion is provided at a position overlapping, in a plan view of the vehicle body, a rear wheel constituting part of the plurality of wheels.

4. The traveling vehicle according to claim 3, wherein
wherein a front end of the lower end portion of the battery
   housing portion overlaps the rear wheel in a plan view
   of the vehicle body, and a rear end of the lower end
   portion of the battery housing portion is located further
   rearward than the rear wheel in a side view of the
   vehicle body.

5. The traveling vehicle according to claim 1, wherein
at least part of the opening or at least part of the opening/
   closing portion is provided at a same height as an upper
   end of the seat or further upward than the upper end of
   the seat.

6. The traveling vehicle according to claim 1, wherein
the opening or the opening/closing portion that is config-
   ured to open and close the opening is provided, in a side
   view of the vehicle body, above a rear wheel consti-
   tuting part of the plurality of wheels or further rearward
   than the rear wheel.

7. The traveling vehicle according to claim 6,
wherein a front end of the lower end portion of the battery
   housing portion overlaps the rear wheel in a plan view
   of the vehicle body, and a rear end of the lower end
   portion of the battery housing portion is located further
   rearward than the rear wheel in a side view of the
   vehicle body.

* * * * *